US012508505B2

(12) United States Patent
Masaki et al.

(10) Patent No.: US 12,508,505 B2
(45) Date of Patent: Dec. 30, 2025

(54) COMPUTER-READABLE NON-TRANSITORY STORAGE MEDIUM HAVING GAME PROGRAM STORED THEREIN, GAME PROCESSING SYSTEM, GAME PROCESSING APPARATUS, AND GAME PROCESSING METHOD

(71) Applicant: NINTENDO CO., LTD., Kyoto (JP)

(72) Inventors: Yoshifumi Masaki, Kyoto (JP); Hiroshi Ueda, Kyoto (JP); Koji Takahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 287 days.

(21) Appl. No.: 17/885,948

(22) Filed: Aug. 11, 2022

(65) Prior Publication Data

US 2023/0090056 A1 Mar. 23, 2023

(30) Foreign Application Priority Data

Sep. 22, 2021 (JP) ................................ 2021-154397

(51) Int. Cl.
*A63F 13/525* (2014.01)
*A63F 13/52* (2014.01)
(Continued)

(52) U.S. Cl.
CPC ............ *A63F 13/525* (2014.09); *A63F 13/52* (2014.09); *A63F 13/53* (2014.09); *A63F 13/55* (2014.09); *A63F 13/63* (2014.09)

(58) Field of Classification Search
CPC ........ A63F 13/525; A63F 13/55; A63F 13/53; A63F 13/63; A63F 13/52
See application file for complete search history.

(56) References Cited

U.S. PATENT DOCUMENTS 5,592,609 A * 1/1997 Suzuki .................... A63F 13/63 463/31
5,680,533 A * 10/1997 Yamato ................... A63F 13/48 463/31

(Continued)

FOREIGN PATENT DOCUMENTS

JP 2006-051402 2/2006
JP 2021-037085 3/2021

OTHER PUBLICATIONS

Light Switch. Giantbomb.com. Online Aug. 4, 2020. Accessed from the Internet. Accessed Aug. 10, 2024. <URL: https://web.archive.org/web/20200804204832/https://www.giantbomb.com/light-switch/3015-4767/> (Year: 2020).*

(Continued)

*Primary Examiner* — Carl V Larsen
(74) *Attorney, Agent, or Firm* — Nixon & Vanderhye P.C.

(57) ABSTRACT

When a predetermined instruction has been made on the basis of an operation input in a case where a positional relationship between a player character and an arrangement object satisfies a predetermined condition, the player character is caused to perform a predetermined action on the arrangement object. Then, on the basis of a virtual camera in a virtual space, a game image in which the player character and the arrangement object are included and in which a predetermined visual effect is added to the arrangement object on which the predetermined action has been performed is generated.

42 Claims, 13 Drawing Sheets

(51) Int. Cl.

| | |
|---|---|
| ***A63F 13/53*** | (2014.01) |
| ***A63F 13/55*** | (2014.01) |
| ***A63F 13/63*** | (2014.01) |

(56) References Cited

U.S. PATENT DOCUMENTS

| | | | | |
|---|---|---|---|---|
| 6,285,381 | B1 * | 9/2001 | Sawano | G06T 11/60 345/634 |
| 6,677,967 | B2 * | 1/2004 | Sawano | G06T 11/60 715/848 |
| 6,894,686 | B2 * | 5/2005 | Stamper | A63F 13/63 345/419 |
| 8,821,234 | B2 * | 9/2014 | Johnston | A63F 13/63 715/272 |
| 10,786,737 | B2 * | 9/2020 | Shochet | A63F 13/63 |
| 2003/0058238 | A1 * | 3/2003 | Doak | A63F 13/45 709/217 |
| 2004/0021680 | A1 * | 2/2004 | Hara | G06T 15/20 715/700 |
| 2010/0029384 | A1 * | 2/2010 | Andersen | A63F 13/577 463/43 |
| 2014/0248948 | A1 * | 9/2014 | Ho | G06F 3/0482 463/31 |
| 2017/0357407 | A1 * | 12/2017 | Palmaro | G06F 3/017 |
| 2019/0204917 | A1 * | 7/2019 | Rihn | G06F 3/013 |
| 2020/0306640 | A1 * | 10/2020 | Kolen | A63F 13/67 |
| 2022/0241691 | A1 * | 8/2022 | Khan | A63F 13/5375 |
| 2022/0398002 | A1 * | 12/2022 | Zhu | A63F 13/60 |
| 2023/0030260 | A1 * | 2/2023 | Jauvin | A63F 13/92 |
| 2024/0033635 | A1 * | 2/2024 | Sano | A63F 13/5375 |

OTHER PUBLICATIONS

Particle System. Wikipedia.org Online. Mar. 31, 2021. Accessed from the Internet. Accessed Aug. 10, 2024. <URL: https://en.wikipedia.org/w/index.php?title=Particle_system&oldid=1021209962> (Year: 2021).*

Animal Crossing: New Horizons. Wikipedia.org. Online. Accessed via the Internet. Accessed Aug. 10, 2024. <URL: https://en.wikipedia.org/wiki/Animal_Crossing:_ New_Horizons> (Year: 2024).*

[Animal Crossing] Basic controls for beginners. Online. Jun. 14, 2020-06-14. Accessed via the Internet. Accessed Aug. 10, 2024-08-10. < URL: https://web.archive.org/web/20200614160455/https://smatu.net/2020/03/22/animal-crossing-basic-operation-for-beginners-new-horizons-switch-ver/> (Year: 2020).*

[Tutorial]Particle Effect Editor. tf2maps.net. Online. Aug. 15, 2009. Accessed via the Internet. Accessed Aug. 10, 2024. < URL: https://tf2maps.net/threads/tutorial-particle-effect-editor.8826/> (Year: 2009).*

Charge. ssbwiki.com. Online. Jun. 8, 2020. Accessed via the Internet. Accessed Aug. 10,2024. <URL: https://www.ssbwiki.com/index.php?title=Charge&oldid=1432196> (Year: 2020).*

Super Mario Maker. Wikipedia.org. Online. May 30, 2021. Accessed via the Internet. Accessed Aug. 10, 2024. <URL: https://en.wikipedia.org/w/index.php?title=Super_Mario_Maker&oldid=1026008502> (Year: 2021).*

Super Mario Maker 2—All Sound Effects. Youtube.com. Online. Jul. 4, 2019. Accessed via the Internet. Accessed Aug. 10, 2024. <URL: https://www.youtube.com/watch?v=ffnqLlrM3n8> (Year: 2019).*

Super Mario Maker for Nintendo 3DS—Overview Trailer. Youtube.com. Online. Nov. 17, 2016. Accessed via the Internet. Accessed Aug. 10, 2024. <URL: https://www.youtube.com/watch?v=9zhE5Sb45O4> (Year: 2016).*

Mario Paint. Wikipedia.org. Online. Accessed via the Internet. Accessed Mar. 20, 2025. <URL: https://en.wikipedia.org/wiki/Mario_Paint> (Year: 1992).*

Mario Paint Instruction Booklet. Nintendo. Accessed via the Internet. Accessed Mar. 20, 2025. <URL: http://www.replacementdocs.com/download.php?view. 1250> (Year: 1992).*

Coin Block. www.mariowiki.com. Online. Dec. 16, 2020. Accessed via the Internet. Accessed Jun. 28, 2025. <URL: https://www.mariowiki.com/index.php?title=Coin_Block&oldid=3086712> (Year: 2020).*

Feb. 7, 2023 Office Action issued in Japanese Patent Application No. 2021-154397 [machine translation included] pp. 1-7.

May 30, 2023 Office Action issued in Japanese Patent Application No. 2021-154397, pp. 1-3 [machine translation included].

"[Atsumori] Try to make a campsite surrounded by mountains. [Collect Animal Crossing]." https://www.youtube.com/watch?v=8fPHhMnjD-s (apparently dated Mar. 29, 2020) [concise statement of the relevance provided in Japanese Office Action submitted herewith].

"[Fortnite] Complete strategy guide to put fire in the bonfire / Winterfest Challenge Day 2." https://www.youtube.com/watch?y=428-wbMecaQ (apparently dated Dec. 19, 2019) [concise statement of the relevance provided in Japanese Office Action submitted herewith].

Nintendo Co., Ltd., "CareFree Island DAYS, Rearrange my home", [online], search Sep. 6, 2021, url:https://www.nintendo.co.jp/switch/acbaa/guide/index.html, "Rearrange my home", 8 pages, partial translation.

Super Mario Maker for Nintendo 3DS introduction video, Youtube [Online] [Video], Nov. 9, 2016, https://www.youtube.com/watch?v=3i2KTPZCOtA [Search date Jan. 30, 2023].

Aug. 7, 2023 Decision to Grant issued in Japanese Patent Application No. 2021-154397, pp. 1-3 [machine translation included].

* cited by examiner

101

| FURNITURE ARTICLE ID (201) | FURNITURE ARTICLE KIND DATA (202) | FURNITURE ARTICLE SIZE (XYZ) DATA (203) |
|---|---|---|
| 0100 | TABLE | 100 × 80 × 100 |
| 0101 | TABLE | 200 × 80 × 100 |
| 0102 | WARDROBE | 200 × 120 × 80 |
| ⋮ | ⋮ | ⋮ |

103

| EFFECT ID (301) | REFERENCE EFFECT DATA (302) | PARTICLE OPERATION DATA (303) | PARTICLE DATA (304) |
|---|---|---|---|
| 0200 | ... | ... | ... |
| 0201 | ... | ... | ... |
| 0202 | ... | ... | ... |
| ⋮ | ⋮ | ⋮ | ⋮ |

COMPUTER-READABLE NON-TRANSITORY STORAGE MEDIUM HAVING GAME PROGRAM STORED THEREIN, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2021-154397 filed on Sep. 22, 2021, the entire contents of which are incorporated herein by reference.

FIELD

The present disclosure relates to game processing in which objects can be arranged in a room or the like in a virtual game space.

BACKGROUND AND SUMMARY

Hitherto, a game in which a user can arrange a furniture article object and the like in a virtual room constructed in a virtual game space has been known.

In the above game, the user can arrange an object, but cannot add visual effects to the arranged object.

Therefore, an object of the exemplary embodiment is to provide a computer-readable non-transitory storage medium having stored therein a game program that allows a user to not only arrange an object but also add a visual effect to the arranged object, a game processing system, a game processing apparatus, and a game processing method.

In order to attain the object described above, for example, the following configuration examples are exemplified.

An example of a configuration example is a computer-readable non-transitory storage medium having stored therein instructions that, when executed by a processor of an information processing apparatus, cause the information processing apparatus to the following operations. The instructions cause the information processing apparatus to: arrange or move at least one arrangement object in a virtual space on the basis of an operation input; move a player character in the virtual space on the basis of an operation input; when a predetermined instruction has been made on the basis of an operation input in a case where a positional relationship between the player character and at least one of the at least one arrangement object satisfies a predetermined condition, cause the player character to perform a predetermined action on the arrangement object; and on the basis of a virtual camera in the virtual space, generate a game image in which the player character and the arrangement object are included and a predetermined visual effect is added to the arrangement object on which the predetermined action has been performed.

According to the above configuration example, a visual effect can be added to an object that has been arranged. In addition, due to combinations of the kind of the object and the kind of the visual effect, the user (player) can perform arrangement of the object in a wider range of expression. In addition, an effect can be added through an operation that is easy to understand for the user.

In another configuration example, the instructions may cause the visual effect to be added by arranging a predetermined particle in a predetermined region including the arrangement object in the virtual space.

According to the above configuration example, the arrangement object can be effectively decorated with the visual effect (particle).

In another configuration example, the particle may be a planar object using a two-dimensional image as a texture.

According to the above configuration example, the visual effect can be added while the process load and the development load are suppressed.

In another configuration example, the instructions may further cause, before causing the player character to perform the predetermined action, a two-dimensional image that is to be used for the particle, to be selected from a plurality of candidate images on the basis of an operation input, and cause the visual effect to be added by using the selected two-dimensional image.

According to the above configuration example, the user can instinctively select a visual effect, and thus, operability is improved.

In another configuration example, the instructions may further cause a two-dimensional image that is to be used as the particle, to be inputted on the basis of an operation input, and cause the two-dimensional image to be saved as a candidate image.

According to the above configuration example, since a visual effect using a two-dimensional image inputted by the user can be added, a variety of visual effects can be used.

In another configuration example, the particle may be a three-dimensional object.

According to the above configuration example, a variety of visual effects having a high degree of presence can be added.

In another configuration example, the instructions may further cause at least one of deformation and movement to be performed in the predetermined region on the particle that has been arranged, thereby causing the visual effect to be added.

According to the above configuration example, a variety of visual effects that cause various visual effects can be added.

In another configuration example, the instructions may further cause, before causing the player character to perform the predetermined action, one of a plurality of representation candidates to be selected on the basis of an operation input; cause a control of at least one of arrangement, deformation, and movement of the particle to be defined to each of the plurality of representation candidates so as to be associated therewith; and cause the particle to be controlled on the basis of a control associated with the selected representation candidate, thereby causing the visual effect to be added.

According to the above configuration example, the user can add a visual effect selected from a variety of visual effects that cause various visual effects.

In another configuration example, the instructions may cause at least one of a size, a deformation speed, or a moving speed of the particle to be set on the basis of a period for which the predetermined instruction has been made or the number of times the predetermined instruction has been made, thereby causing the visual effect to be added.

According to the above configuration example, the user can set the manner of a visual effect to be added.

In another configuration example, the instructions may further cause the visual effect to be canceled, on the basis of an operation input, with respect to the arrangement object to which the visual effect has been added.

According to the above configuration example, the user can cancel the added visual effect.

In another configuration example, the predetermined action may be an action of wiping or polishing the arrangement object performed by the player character.

In another configuration example, the arrangement object may be a furniture article object.

According to the exemplary embodiment, the user can arrange an object, and in addition, can add a visual effect to the arranged object.

These and other objects, features, aspects, and advantages of the exemplary embodiment will become more apparent from the following detailed description of non-limiting example embodiments when taken in conjunction with the accompanying drawings.

DETAILED DESCRIPTION OF NON-LIMITING EXAMPLE EMBODIMENTS

Hereinafter, an embodiment will be described.

[Hardware Configuration of Information Processing Apparatus]

First, an information processing apparatus for executing such information processing according to the exemplary embodiment will be described. The information processing apparatus is, for example, a smartphone, a stationary or hand-held game apparatus, a tablet terminal, a mobile phone, a personal computer, a wearable terminal, or the like. The information processing according to the exemplary embodiment can also be applied to a game system including a game apparatus, etc., as described above, and a predetermined server. In the exemplary embodiment, a stationary game apparatus (this may be referred to as a "game apparatus") is described as an example of the information processing apparatus.

Figure 1:
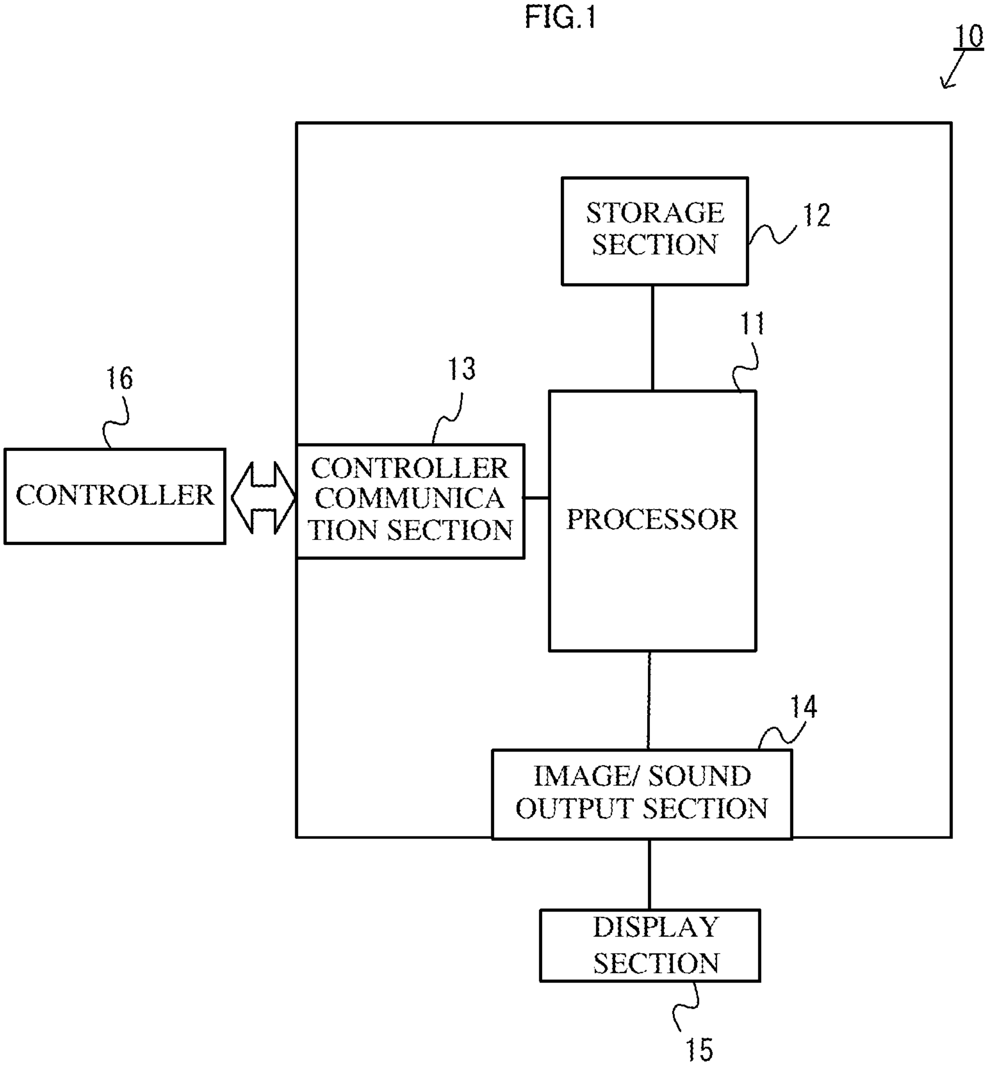
FIG. 1 is a block diagram showing an example of the internal configuration of a game apparatus 10.

FIG. 1 is a block diagram showing an example of the internal configuration of a game apparatus 10 according to the exemplary embodiment. The game apparatus 10 includes a processor 11. The processor 11 is an information processing section for executing various types of information processing to be executed by the game apparatus 10. For example, the processor 11 may be composed only of a CPU (Central Processing Unit), or may be composed of a SoC (System-on-a-chip) having a plurality of functions such as a CPU function and a GPU (Graphics Processing Unit) function. The processor 11 performs various types of information processing by executing an information processing program (e.g., a game program) stored in a storage section 12. The storage section 12 may be, for example, an internal storage medium such as a flash memory and a DRAM (Dynamic Random Access Memory), or may be configured to utilize an external storage medium mounted to a slot that is not shown, or the like.

Furthermore, the game apparatus 10 includes a controller communication section 13 for allowing the game apparatus 10 to perform wired or wireless communication with a controller 16. Although not shown, the controller 16 is provided with various kinds of buttons such as a cross key and ABXY buttons, an analog stick, and the like.

A display section 15 (e.g., a television) is connected to the game apparatus 10 via an image/sound output section 14. The processor 11 outputs images and sounds generated (by execution of the above-described information processing, for example), to the display section 15 via the image/sound output section 14.

[Outline of Game Processing of the Exemplary Embodiment]

Next, an outline of operation of game processing executed by the game apparatus 10 according to the exemplary embodiment will be described. In this game processing, executed is game processing in which an arrangement item, which is a kind of an object in a game and which has been obtained in the game by the user, is arranged in a predetermined area in a virtual space, and a game image is, for example, generated by a virtual camera. For example, the predetermined area is a room (this may be referred to simply as a "room") in the virtual space which a player character object (this may be referred to as a "player character") can enter. The arrangement item is a virtual object for decorations, interiors, and the like of the room, and more specifically, a virtual object using a furniture article, a home appliance, an interior decoration article, or the like as a motif. A game in which the user arranges these arrangement items in the above-described room or the like, thereby being able to decorate (customize) the room, is executed. The processing according to the exemplary embodiment relates to processing for performing decoration of this room, and in particular, is processing of adding a visual effect to the above-described virtual object (hereinafter, this may be referred to simply as an "effect").

Figure 2:
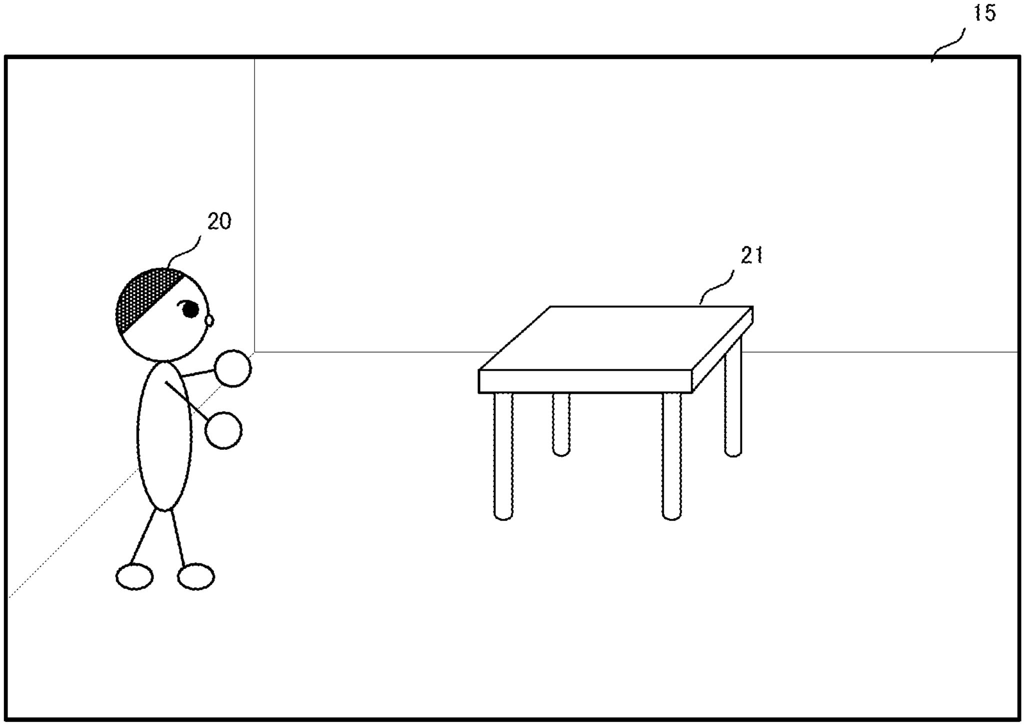
FIG. 2 shows a non-limiting example of a game screen.

Next, using a screen example (game image example), an outline of the game processing according to the exemplary embodiment will be described. FIG. 2 is an example of a screen in which a player character 20 is in a room in which a table 21 is arranged, in this game.

First, the user (player) can arrange an arrangement item such as a furniture article in a room by performing a predetermined operation. For example, the user performs a predetermined operation of selecting a furniture article to be arranged, and then performs a predetermined operation of designating a position and an orientation for arranging the furniture article, thereby being able to arrange the furniture article in the room. In addition, the user can move an arrangement item, e.g., furniture article, that has been arranged, and can change the orientation thereof. For example, the user performs a predetermined operation of selecting a furniture article that is to be moved or of which the orientation is to be changed, and then, performs a predetermined operation, thereby being able to move the furniture article or change the orientation thereof. In FIG. 2, through the operation by the user, the table 21 is arranged at a predetermined position of the room.

In addition, the user can move the player character 20 or change the direction thereof by performing a predetermined operation (e.g., an operation of the analog stick).

Figure 3:
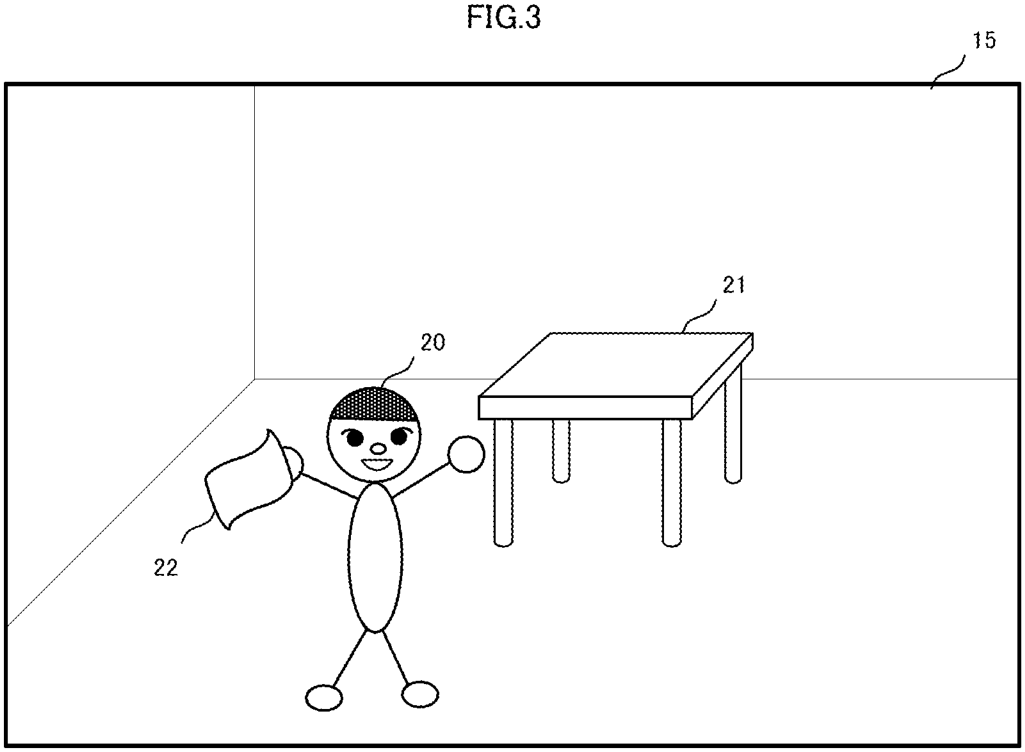
FIG. 3 shows a non-limiting example of a game screen.

FIG. 3 is an example of a screen in which the player character 20 holds a dustcloth 22 in this game. In this game, by performing a predetermined operation (e.g., an operation of pressing the A button), the user can cause the player character 20 to hold the dustcloth 22, as shown in FIG. 3. As described later, in this game, when the player character 20 performs an operation of polishing (or wiping, etc.), with the dustcloth 22, an item such as a furniture article arranged in the room, an effect can be added to the furniture article or the like.

Figure 4:
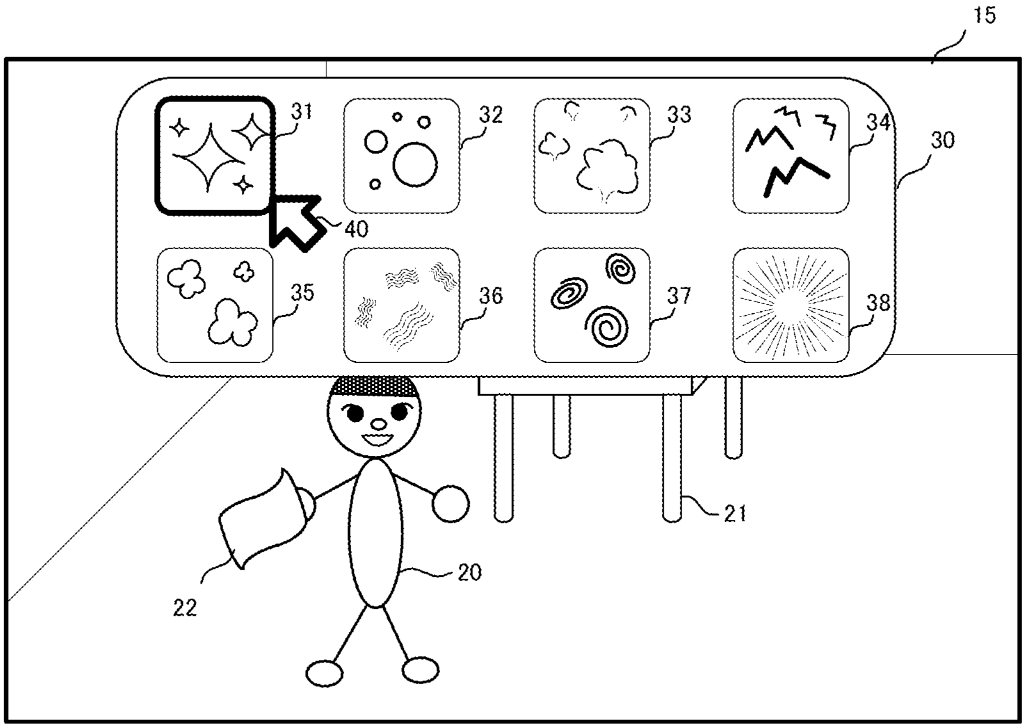
FIG. 4 shows a non-limiting example of a game screen.

FIG. 4 is an example of a screen in which an effect selection window 30 is displayed in this game. In this game, as shown in FIG. 4, upon the player character 20 holding the dustcloth 22 (see FIG. 3), the effect selection window 30 for selecting an effect to be added to an item such as a furniture article, is displayed. In the effect selection window 30, a cursor 40 and a list of effect images showing the effects (the types of effects) that can be added to an item such as a furniture article, are displayed.

In the example in FIG. 4, effect images 31 to 38 are displayed in a list. As shown in FIG. 4, the effect image 31 is an image showing an effect of displaying a particle using a texture of a diamond shape that depicts shining. The effect image 32 is an image showing an effect of displaying a particle using a texture that looks like a soap bubble. The effect image 33 is an image showing an effect of displaying a particle using a texture that looks as if dust is appearing. The effect image 34 is an image showing an effect of displaying a particle using a texture of a jaggy pattern such as teeth of a saw. The effect image 35 is an image showing an effect of displaying a particle using a texture that looks like a butterfly. The effect image 36 is an image showing an effect of displaying a particle using a texture of a wave pattern. The effect image 37 is an image of an effect of displaying a particle using a texture of a spiral pattern. The effect image 38 is an image showing an effect of displaying a particle using a texture that looks like light in a radial shape. The user can select a desired effect image by performing a predetermined operation (e.g., an operation of moving the cursor 40 by operating the cross key, to select an effect image, and then pressing the A button).

Here, in each effect displayed in the effect selection window 30, at least one of the occurrence position (and the number of occurrence positions), the occurrence number per unit time, and the motion (animation including movement, deformation, expansion/contraction, rotation, speed change, and the like) of the particle is different. That is, the behavior and the like of the particle is different for each effect. In addition, in the effects displayed in the effect selection window 30, the particles (the textures of the particles) are different from each other as described above.

Figure 5:
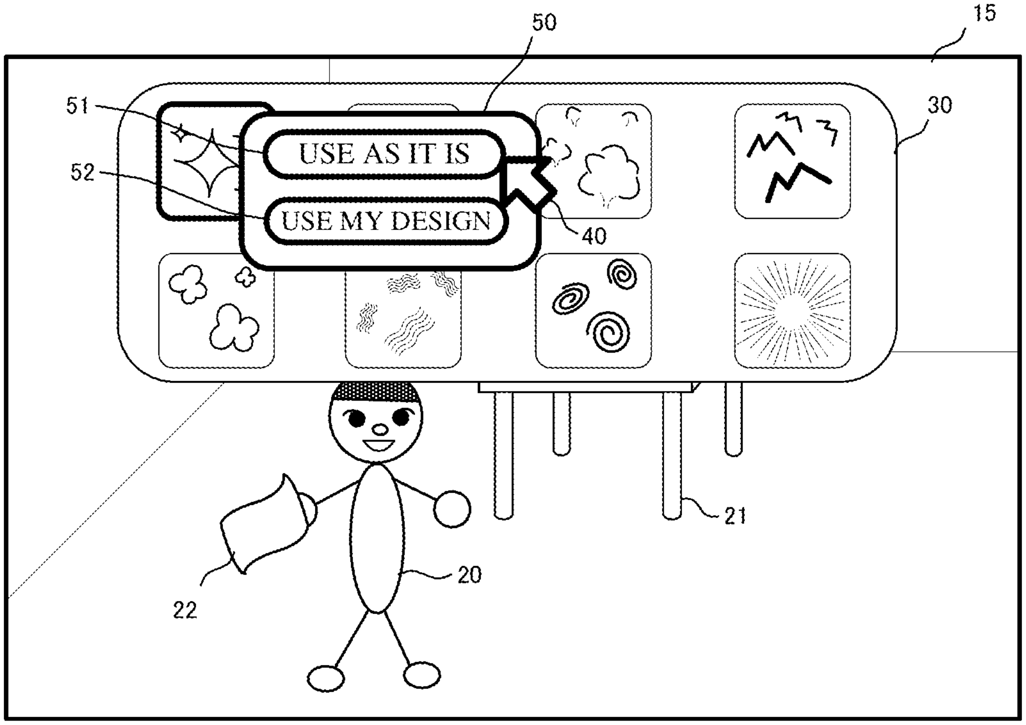
FIG. 5 shows a non-limiting example of a game screen.

FIG. 5 is an example of a screen in which a my-design use/non-use selection window 50 is displayed on the effect selection window 30 described above. When an effect has been selected in the effect selection window 30, the my-design use/non-use selection window 50 is displayed as shown in FIG. 5. In the my-design use/non-use selection window 50, a button 51 indicating "use as it is" and a button 52 indicating "use my design" are displayed. Then, when the user has operated the cursor 40 to select the button 51 indicating "use as it is", the effect selected by the user in the effect selection window 30 is set as the effect to be used. Meanwhile, when the user has operated the cursor 40 to select the button 52 indicating "use my design", an effect that uses my design having been created and saved in advance by the user is set as the effect to be used.

Figure 6:
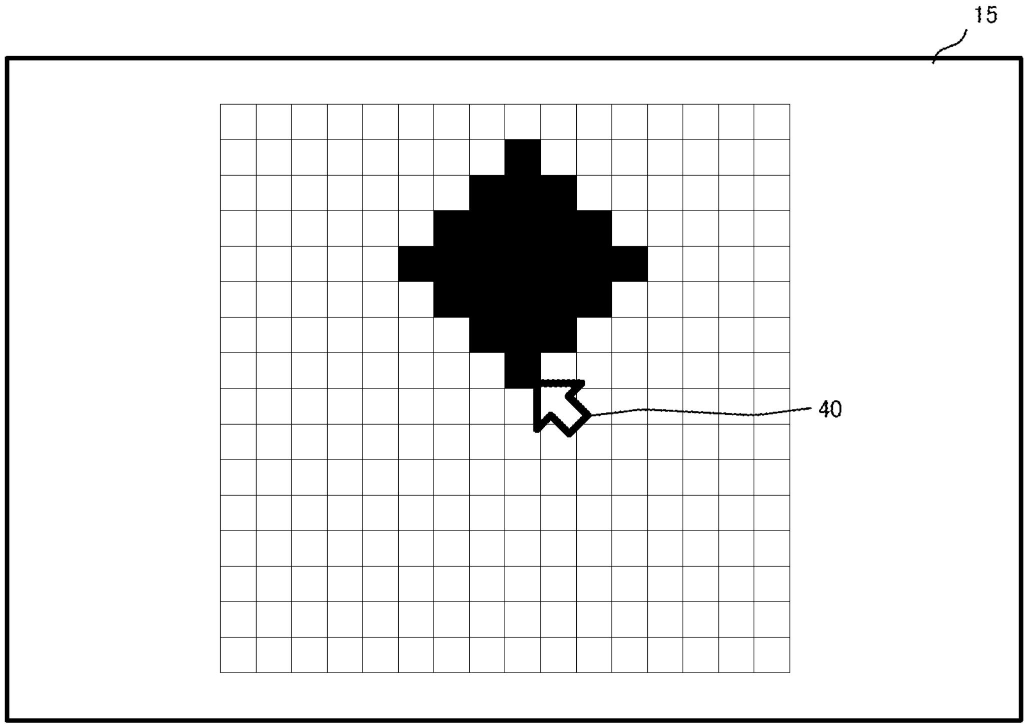
FIG. 6 shows a non-limiting example of a game screen.

Here, my design is a particle (or the texture of a particle) created by the user. FIG. 6 is a diagram for describing my design (particle) created by the user. In this game, the user can cause a my-design creation screen in FIG. 6, to be displayed in the display section 15, by performing a predetermined operation (e.g., an operation of pressing an R button). In the my-design creation screen, two-dimensional small squares and the cursor 40 are displayed, and the user can render my design (a texture of a particle) on the squares. Specifically, the user can render a dot picture by performing a predetermined operation (e.g., an operation of the cross key) to move the cursor 40 and designate desired squares, and then performing a predetermined operation (e.g., an operation of pressing an L button) to color the squares (dots). In FIG. 6, a dot picture in a diamond shape is rendered. Then, the user can save (set) the created dot picture as the texture of the particle of my design, by performing a predetermined operation (e.g., an operation of pressing the R button).

When the user has operated the my-design use/non-use selection window 50 and the like, and selected (set) an effect to be used, display of the my-design use/non-use selection window 50 ends. Then, when the user moves the player character 20 by performing a predetermined operation (e.g., an operation of the analog stick), to cause the player character 20 to face the vicinity (e.g., at a distance within 30 cm in the virtual space) of the furniture article or the like to which the effect is to be added, and then performs a predetermined operation (e.g., an operation of pressing the A button), the user can add the effect (this may be referred to as a "use effect") set as the effect to be used, to the furniture article or the like faced by the player character 20.

Figure 7:
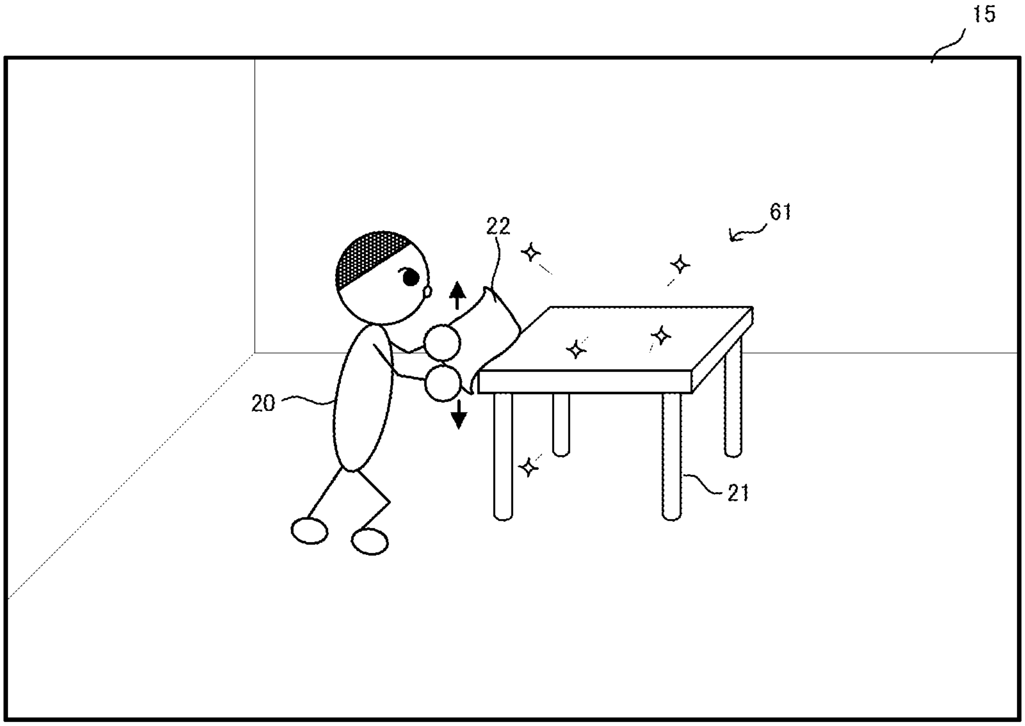
FIG. 7 shows a non-limiting example of a game screen.

FIG. 7 is an example of a screen in which a use effect 61 has been added to a furniture article or the like. As shown in FIG. 7, when a predetermined operation (e.g., an operation of pressing the A button) has been performed in a state where the player character 20 is close to the table 21 directly from the front thereof, an action in which the player character 20 polishes (or wipes) the table 21 with the dustcloth 22 is started, and the use effect 61 is added to the table 21. Here, the action in which the player character 20 polishes (or wipes, for example) the table 21 with the dustcloth 22 at this time is a small-scale operation, and this operation will be referred to as a "first stage polishing operation". In addition, a small-scale effect that is added at this time will be referred to as a "first stage effect". In FIG. 7, the player character 20 performs the first stage polishing operation on the table 21, and an effect 61 (the first stage effect) shown by the effect image 31 displayed in the my-design use/non-use selection window 50 is added to the table 21.

Figure 8:
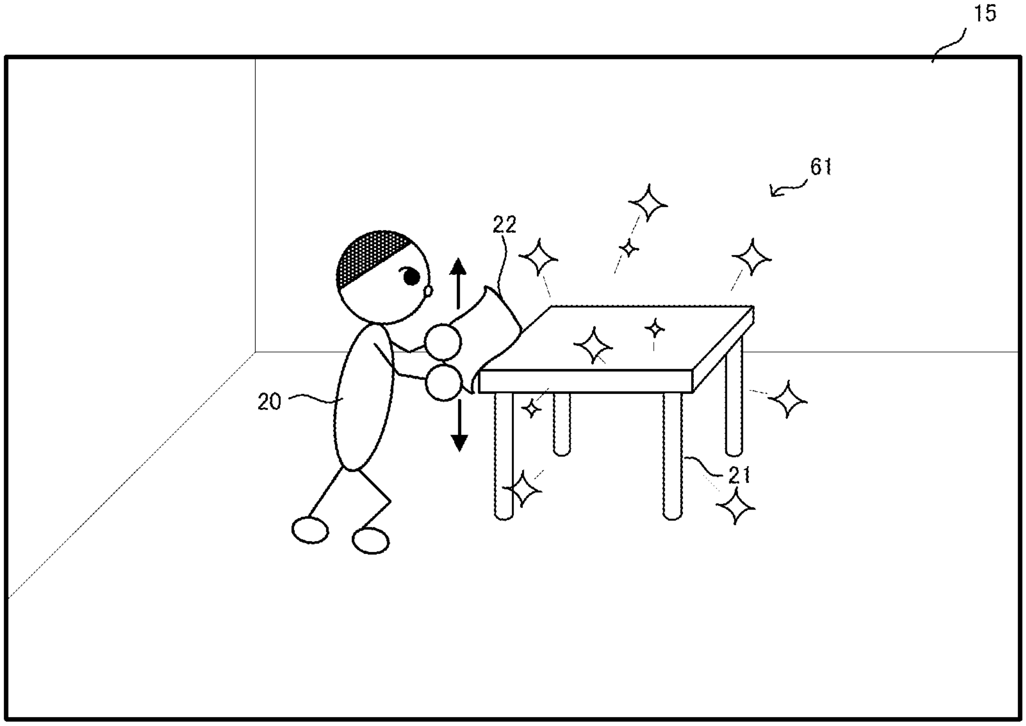
FIG. 8 shows a non-limiting example of a game screen.

Then, when the above-described predetermined operation (the operation of pressing the A button) has been continued for a first predetermined time (e.g., 5 seconds), the action in which the player character 20 polishes (or wipes, for example) the table 21 with the dustcloth 22 becomes a middle-scale operation (this operation will be referred to as a “second stage polishing operation”), and at the same time, the effect 61 becomes a middle-scale effect (this effect will be referred to as a “second stage effect”), as shown in FIG. 8.

Figure 9:
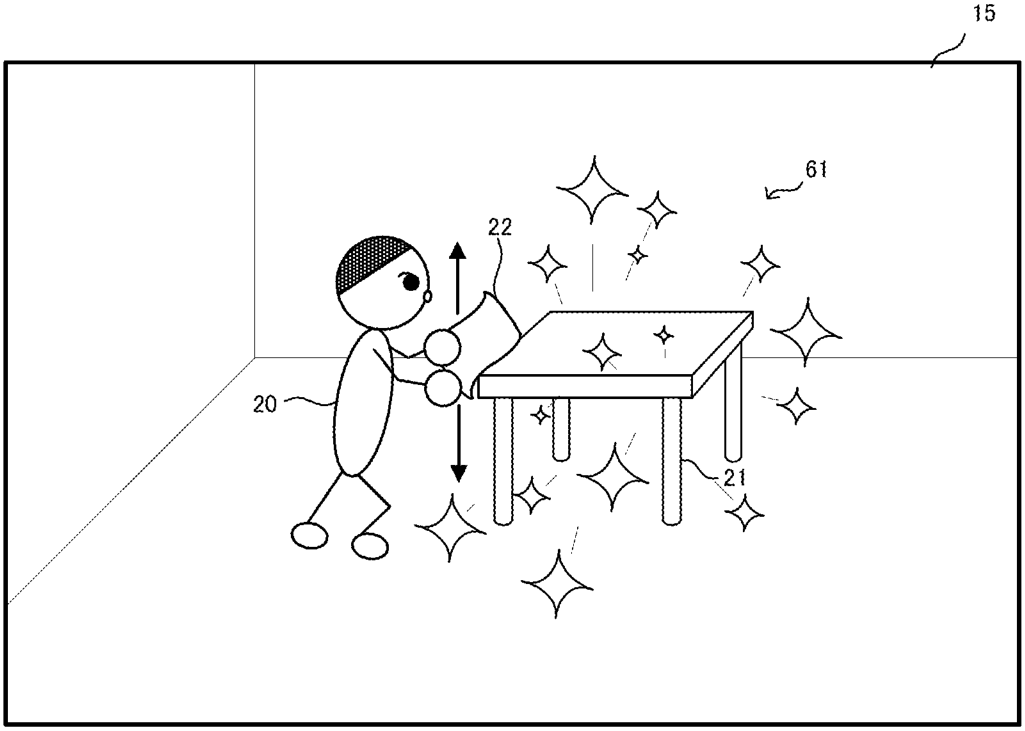
FIG. 9 shows a non-limiting example of a game screen.

Then, when the above-described predetermined operation (e.g., the operation of pressing the A button) has been continued for a second predetermined time (e.g., 10 seconds), the action in which the player character 20 polishes (or wipes, for example) the table 21 with the dustcloth 22 becomes a large-scale operation (this operation will be referred to as a “third stage polishing operation”), and at the same time, the effect 61 becomes a large-scale effect (this effect will be referred to as a “third stage effect”), as shown in FIG. 9.

As described above, in the exemplary embodiment, when an operation of pressing the A button has been performed, a small-scale first stage polishing operation is performed by the player character 20, and a small-scale first stage effect is added. Then, when the operation of pressing the A button has been continued for the first predetermined time (e.g., 5 seconds), the action of the player character 20 is switched to a middle-scale second stage polishing operation, and the effect 61 is switched to a middle-scale second stage effect. Then, when the operation of pressing the A button has been continued for the second predetermined time (e.g., 10 seconds), the action of the player character 20 is switched to a large-scale third stage polishing operation, and the effect 61 is switched to a large-scale third stage effect. It should be noted that, when continuation of the operation of pressing the A button (the predetermined operation) has ended, the action of the player character 20 ends, and a state where an effect 61 of the scale (any of the first to third stage effects) at that time point is added is set.

When compared with the first stage effect, in the second stage effect, at least one of the scales of the occurrence position (and the number of occurrence positions), the size, the occurrence number per unit time, and the motion (movement path and moving speed, deformation manner and deformation speed, expansion/contraction manner and expansion/contraction speed, rotation manner and rotation speed, speed changing manner, etc.) of the particle is greater. Similarly, when compared with the second stage effect, in the third stage effect, at least one of the scales of the occurrence position (and the number of occurrence positions), the size, the occurrence number per unit time, and the motion (movement path and moving speed, deformation manner and deformation speed, expansion/contraction manner and expansion/contraction speed, rotation manner and rotation speed, speed changing manner, etc.) of the particle is greater.

The user can delete the effect added to the furniture article or the like. Specifically, when the user moves the player character 20 by performing a predetermined operation (e.g., an operation of the analog stick), to cause the player character 20 to face the vicinity (e.g., at a distance within 30 cm in the virtual space) of the furniture article or the like to which the effect has been added, and then, performs a predetermined operation (e.g., an operation of pressing the A button), the user can delete (cancel) the effect that has been added.

Figure 10:
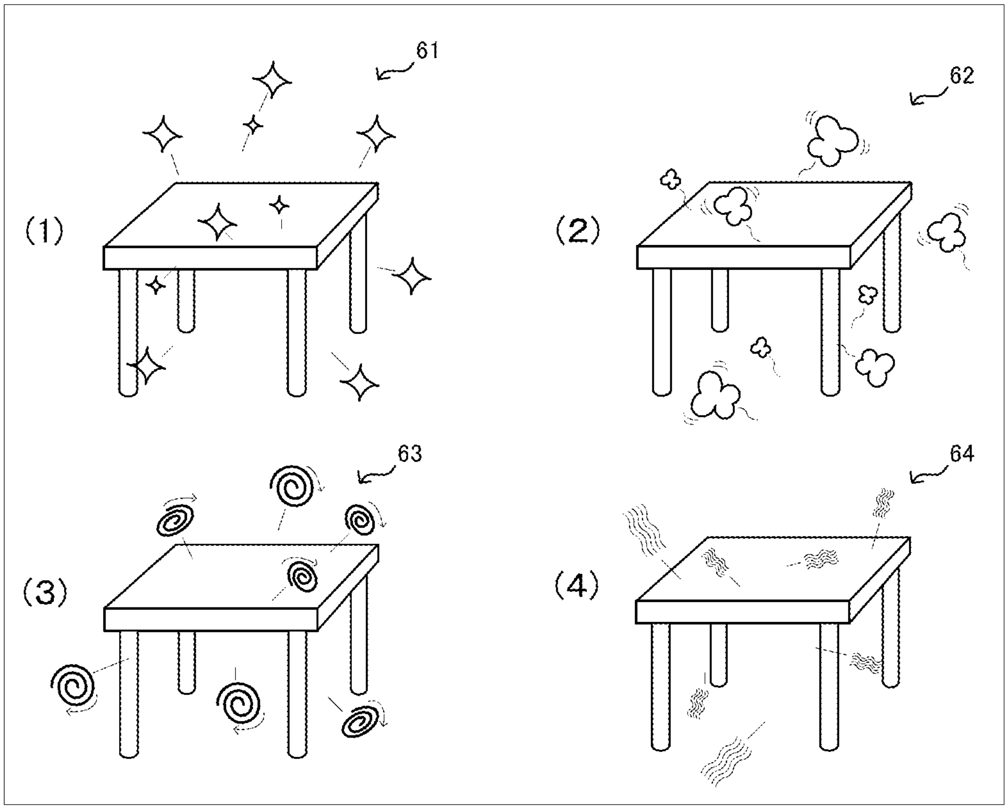
FIG. 10 shows a non-limiting example of visual effect display.

FIG. 10 is a diagram for describing specific examples of effects. In FIG. 10, (1) is an example in which the effect 61 (second stage effect) shown by the effect image 31 (see FIG. 4) has been added to the table 21, (2) is an example in which an effect 62 (second stage effect) shown by the effect image 35 has been added to the table 21, (3) is an example in which an effect 63 (second stage effect) shown by the effect image 37 has been added to the table 21, and (4) is an example in which an effect 64 (second stage effect) shown by the effect image 36 has been added to the table 21.

As shown in (1) of FIG. 10, the effect 61 is an effect displaying a particle using a texture of a two-dimensional (plane shaped) diamond shape. For example, the effect 61 is an effect in which the number of occurrence positions of the particle is 10, and while each particle having occurred from a corresponding occurrence position of the particle gradually becomes large, the particle linearly and radially moves in the outward direction without being rotated or deformed, and then disappears. As shown in (2) of FIG. 10, the effect 62 is an effect of displaying a particle using a butterfly for which the textures of the two-dimensional (plane shaped) left and right wings move (are deformed) as if they were flapping. For example, the effect 62 is an effect in which the number of occurrence positions of the particle is 8, and each particle (butterfly) having occurred from a corresponding occurrence position of the particle and having a different size moves as if gently flying without changing the size thereof, and then disappears. As shown in (3) of FIG. 10, the effect 63 is an effect of displaying a particle using the texture of a two-dimensional (plane shaped) spiral pattern. For example, the effect 63 is an effect in which the number of occurrence positions of the particle is 7, and while each particle (spiral pattern) having occurred from a corresponding occurrence position of the particle is rotating, the particle moves linearly and radially in the outward direction without being deformed, and then disappears. As shown in (4) of FIG. 10, the effect 64 is an effect of displaying a particle using a texture of a two-dimensional (plane shaped) wave pattern. For example, the effect 64 is an effect in which the number of occurrence positions of the particle is 9, and each particle (wave pattern) having occurred from a corresponding occurrence position of the particle moves linearly and radially in the outward direction without being rotated or deformed, and then disappears.

Figure 11:
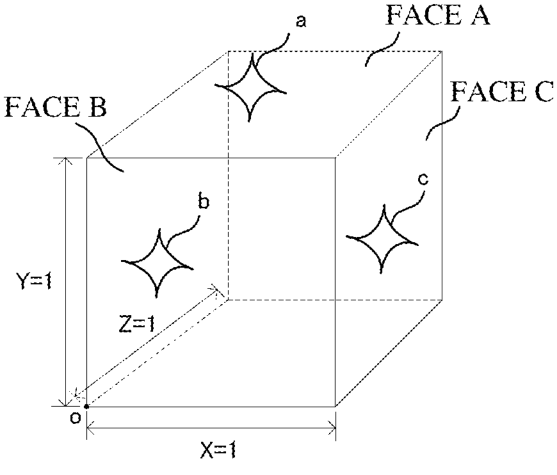
FIG. 11 shows a non-limiting example of a reference effect for performing visual effect display.

FIG. 11 shows an example of a reference effect to be used when an effect is added to a furniture article or the like. As shown in FIG. 11, the reference effect defines a space (this may be referred to as a “reference cube space”) of a cube of which the lengths in the XYZ directions are each 1, and defines a position (this may be referred to as a “particle occurrence position”) at which a particle occurs on a surface of the reference cube space. In the reference effect show in FIG. 11, in the reference cube space, a particle occurrence position a is defined on a face A, a particle occurrence position b is defined on a face B, and a particle occurrence position c is defined on a face C. More specifically, the particle occurrence position a is set to a position (coordinate) of X=0.2, Y=1.0, Z=0.6, with an origin O set as a reference. The particle occurrence position b is set to a position (coordinate) of X=0.2, Y=0.6, Z=0, with the origin O set as a reference. The particle occurrence position c is set to a position (coordinate) of X=1.0, Y=0.5, Z=0.4, with the origin O set as a reference. That is, in the reference effect in FIG. 11, three particle occurrence positions are defined. In FIG. 11, as an example, each particle occurrence position is provided with the particle shown in (1) of FIG. 10.

Figure 12:
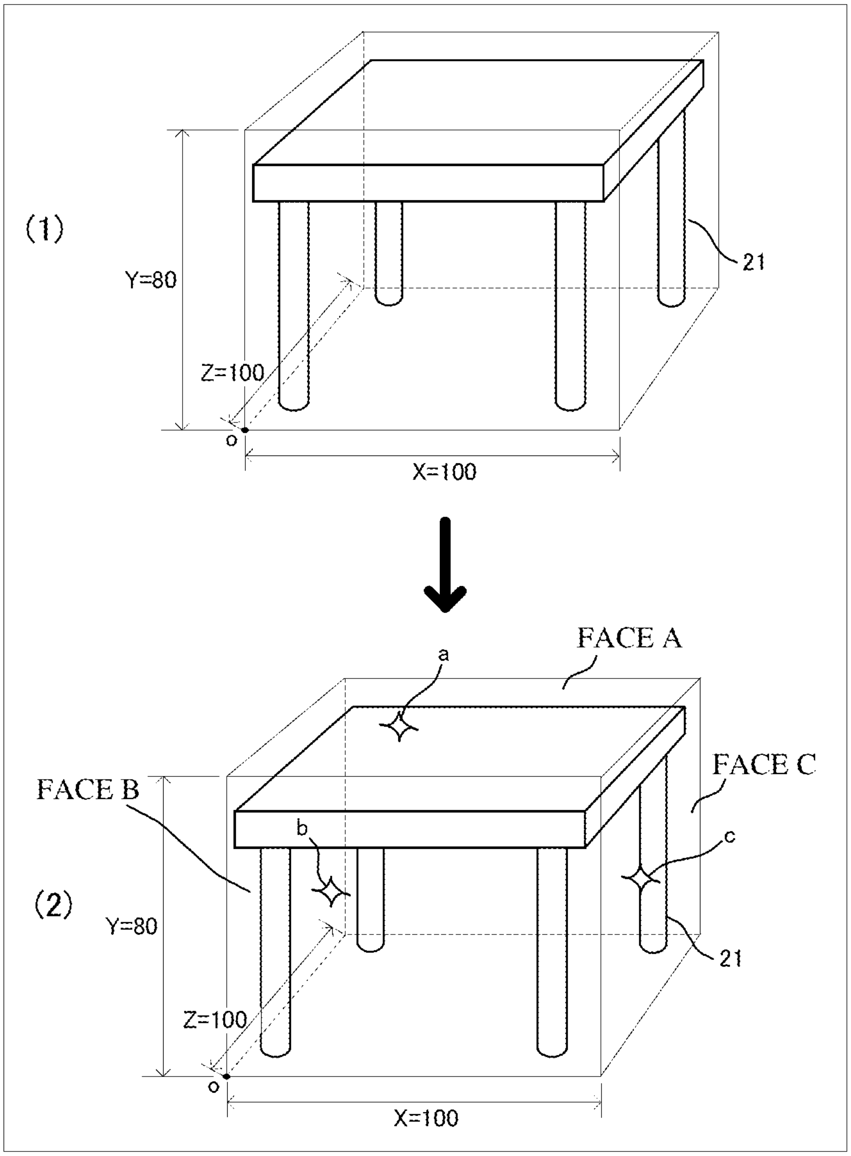
FIG. 12 shows a non-limiting example of visual effect display in which a reference effect is applied to a furniture article.

FIG. 12 is a diagram for describing an example in which an effect is added to the table 21 by applying the reference effect shown in FIG. 11 to the table 21. As shown in (1) of FIG. 12, the size of the table 21 is X=100, Y=80, Z=100.

When the effect is added by expanding and applying (scaling) the size of the reference effect in FIG. 11 to the size of the table 21, (2) of FIG. 12 is realized. Specifically, as shown in (2) of FIG. 12, with the origin O set as a reference, the particle occurrence position a is set to the position (coordinate) of X=20, Y=80, Z=60, the particle occurrence position b is set to the position (coordinate) of X=20, Y=48, Z=0, and the particle occurrence position c is set to the position (coordinate) of X=100, Y=40, Z=40.

Figure 13:
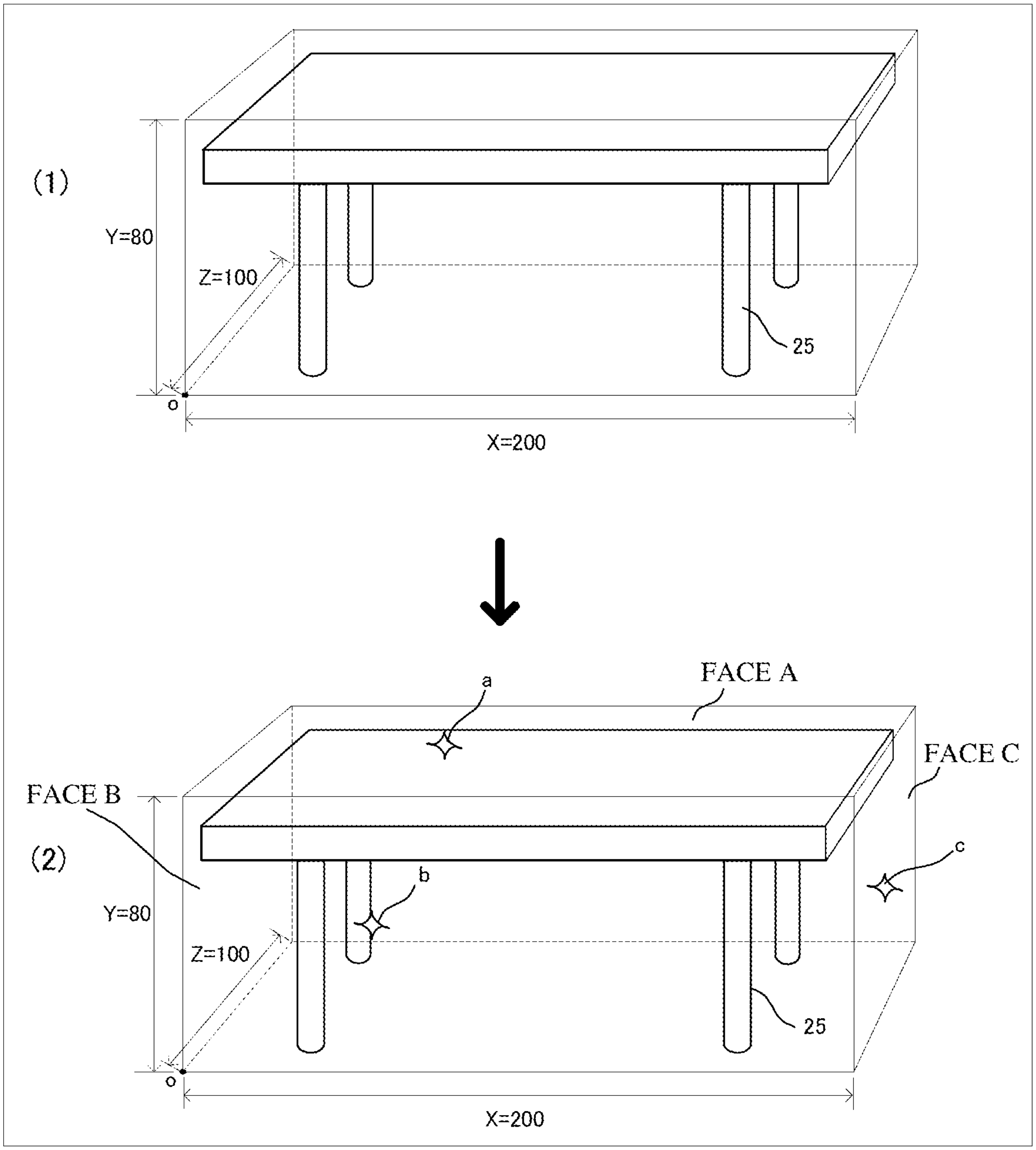
FIG. 13 shows a non-limiting example of visual effect display in which a reference effect is applied to a furniture article.

FIG. 13 is a diagram for describing an example in which an effect is added to a table 25 by applying the reference effect shown in FIG. 11 to a table 25. As shown in (1) of FIG. 13, the size of the table 25 is X=200, Y=80, Z=100. When the effect is added by expanding and applying (scaling) the size of the reference effect in FIG. 11 to the size of the table 25, (2) of FIG. 13 is realized. Specifically, as shown in (2) of FIG. 13, with the origin O set as a reference, the particle occurrence position a is set to the position (coordinate) of X=40, Y=80, Z=60, the particle occurrence position b is set to the position (coordinate) of X=40, Y=48, Z=0, and the particle occurrence position c is set to the position (coordinate) of X=200, Y=40, Z=40.

It should be noted that the reference effect is set for each effect (see FIG. 4 and FIG. 10), and thus, the number and places (position) of particle occurrence positions can be set for each effect. As described above, the reference effect is applied so as to suit the size of the furniture article, to add an effect to the furniture article. However, the size of the furniture article does not influence the size, behavior, etc., of the particle to which the effect has been added.

[Details of Information Processing of the Exemplary Embodiment]

Next, with reference to FIG. 14 to FIG. 20, information processing of the exemplary embodiment will be described in detail.

[Data to be Used]

Figures 14, 15:
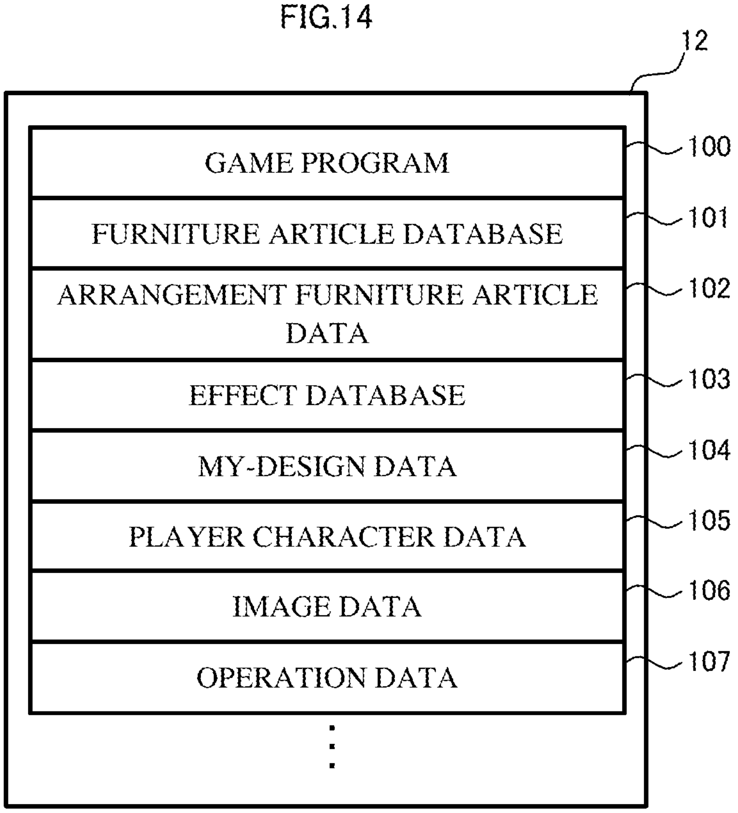
FIG. 14 shows a non-limiting example of various kinds of data stored in a storage section 12.
FIG. 15 shows a non-limiting example of a data configuration of a furniture article database 101.

Various kinds of data to be used in this game processing will be described. FIG. 14 shows an example of a program and data stored in the storage section 12 of the game apparatus 10. A game program 100, a furniture article database 101, arrangement furniture article data 102, an effect database 103, my-design data 104, player character data 105, image data 106, operation data 107, and the like are stored in the storage section 12.

The game program 100 is a game program for executing the game processing according to the exemplary embodiment.

The furniture article database 101 is data defining furniture articles that can be arranged in the virtual space of this game. FIG. 15 shows an example of a data configuration of the furniture article database 101. As shown in FIG. 15, the furniture article database 101 includes furniture article ID 201, furniture article kind data 202, and furniture article size data 203.

The furniture article ID 201 is an identifier for uniquely identifying a furniture article.

The furniture article kind data 202 is data defining the kind of a furniture article.

The furniture article size data 203 is data defining the size of a furniture article.

The arrangement furniture article data 102 is data defining a furniture article (furniture article ID 201) that has been arranged in the virtual space of this game, the position and orientation of the furniture article, whether or not an effect has been added, the effect that has been added, and the like.

Figures 16, 17:
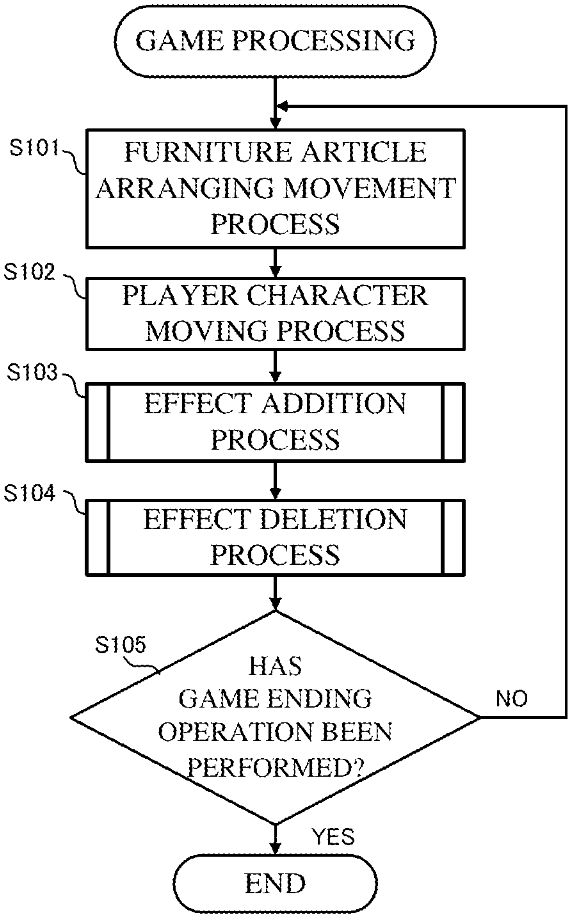
FIG. 16 shows a non-limiting example of a data configuration of an effect database 103.
FIG. 17 is a non-limiting example of a flow chart showing game processing.

The effect database 103 is data defining effects that can be added to a furniture article. FIG. 16 shows an example of a data configuration of the effect database 103. As shown in FIG. 16, the effect database 103 includes effect ID 301, reference effect data 302, particle operation data 303, and particle data 304.

The effect ID 301 is an identifier for uniquely identifying an effect (the kind of the effect).

The reference effect data 302 is data defining a reference effect (see FIG. 11), and is data defining the number and places of particle occurrence positions.

The particle operation data 303 is data defining a behavior of a particle that occurs at a particle occurrence position, and is data defining the motion of the particle (animation including movement, deformation, expansion/contraction, rotation, speed change, and the like).

The particle data 304 is data defining a particle that is caused to occur, and is data defining a texture of a plane rendered at the particle.

The my-design data 104 is data of a particle (see FIG. 6) created and saved by the user, and is data defining a texture of a plane rendered at the particle.

The player character data 105 is data defining the player character 20 in the virtual space of this game, and is data defining the position, orientation, state, and the like of the player character 20.

The image data 106 is image data of the player character 20, a furniture article, or the like.

The operation data 107 is data showing an operation performed on the game apparatus 10.

[Details of Game Processing]

Next, details of the game processing according to the exemplary embodiment will be described with reference to a flow chart. FIG. 17 to FIG. 20 are examples of flow charts showing details of the game processing according to the exemplary embodiment.

The game processing shown in FIG. 17 is started when a predetermined operation of starting this game is performed by the user. In the following, processing of, for example, adding of an effect to a furniture article will be described, and description of the other processing will be omitted.

In step S101 in FIG. 17, the processor 11 performs a furniture article arranging movement process. Specifically, when the user has performed an operation of selecting a desired furniture article and arranging the selected furniture article in the virtual space (room), the processor 11 arranges the furniture article selected by the user, on the basis of data of the operation data 107 and the furniture article database 101. When the user has performed an operation of moving (or changing the orientation) of a furniture article having been arranged, the processor 11 moves (or changes the orientation) of the furniture article on the basis of the operation data 107 and the arrangement furniture article data 102. Through the process of step S101, as described with reference to FIG. 2, the user can arrange the furniture article in the virtual space (a room in the virtual space), or can move the arranged furniture article. Then, the process proceeds to step S102.

In step S102, the processor 11 performs a player character moving process of, for example, moving the player character 20. Specifically, when the user has performed an operation of moving (or changing the orientation) of the player character 20, the processor 11 moves (or changes the orientation) of the player character 20 on the basis of the operation data 107 and the player character data 105. Through the process of step S102, as described with reference to FIG. 2, the user can freely, for example, move the player character 20 in the virtual space. Then, the process proceeds to step S103.

In step S103, the processor 11 performs an effect addition process of adding an effect to the furniture article arranged in the virtual space (a room in the virtual space).

Figure 18:
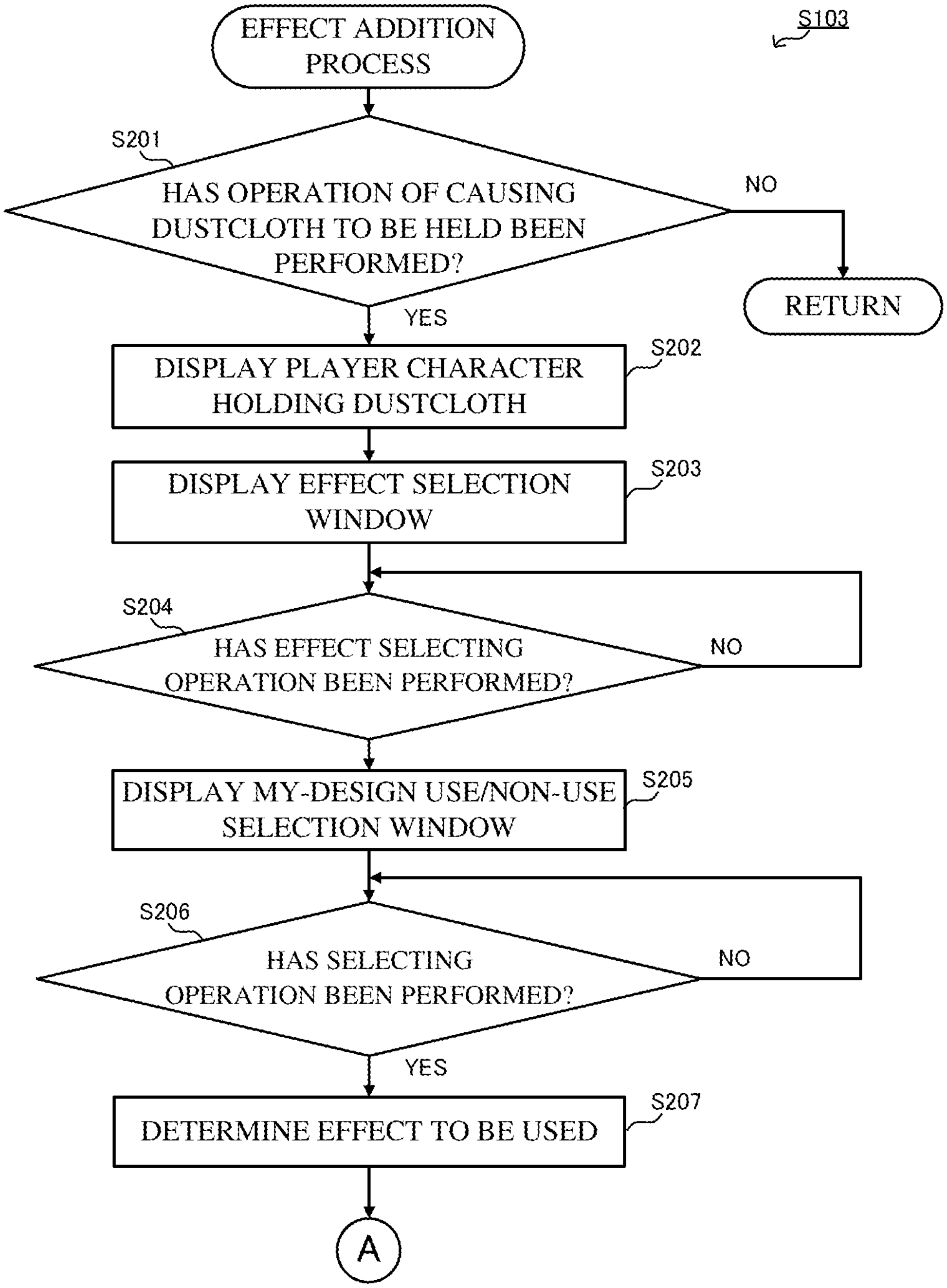
FIG. 18 is a non-limiting example of a flow chart showing an effect addition process.
Figure 19:
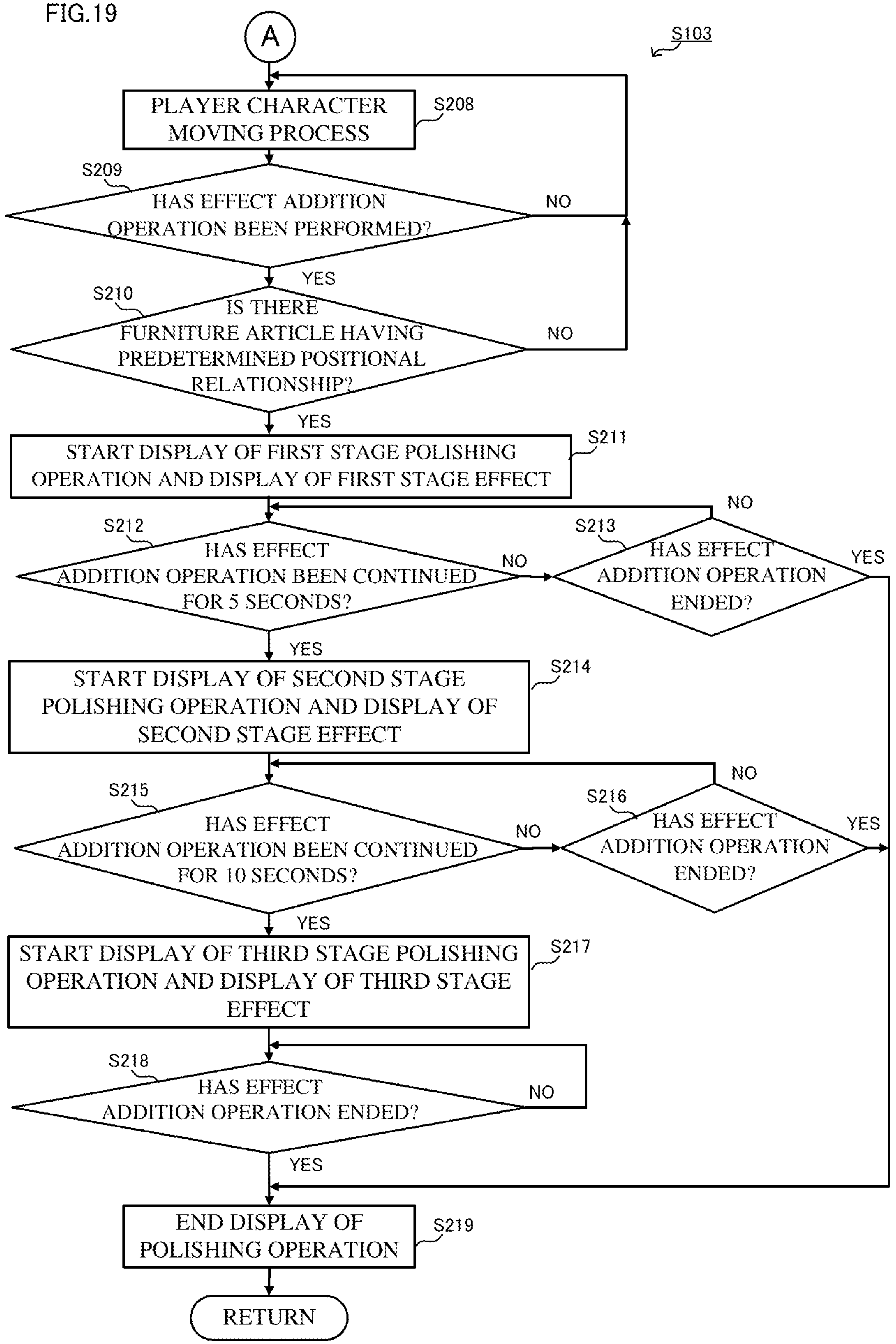
FIG. 19 is a non-limiting example of a flow chart showing the effect addition process.

FIG. 18 and FIG. 19 show an example of a detailed flow chart of the effect addition process of step S103. In the following, the effect addition process will be described with reference to FIG. 18 and FIG. 19.

In step S201 of FIG. 18, the processor 11 determines whether or not the user has performed an operation (an operation of pressing the A button) of causing the player character 20 to hold a dustcloth 22, on the basis of the operation data 107. When the determination in step S201 is YES, the process proceeds to step S202, and when this determination is NO, the process proceeds to S104 in FIG. 17.

In step S202, as described with reference to FIG. 3, the processor 11 causes the display section 15 to perform display of the player character 20 holding the dustcloth 22. Then, the process proceeds to step S203.

In step S203, as described with reference to FIG. 4, the processor 11 causes the display section 15 to perform display of the effect selection window 30. Then, the process proceeds to step S204.

In step S204, on the basis of the operation data 107, the processor 11 waits (NO) until the user performs an operation of selecting any of the effect images displayed in the effect selection window 30 (an operation of moving the cursor 40 by operating the cross key, to select an effect image, and then pressing the A button), and when an operation of selecting any of the effect images has been performed (YES), the processor 11 advances the process to step S205.

In step S205, as described with reference to FIG. 5, the processor 11 causes the my-design use/non-use selection window 50 to be displayed on the effect selection window 30. Then, the process proceeds to step S206.

In step S206, on the basis of the operation data 107, the processor 11 waits (NO) until the user performs an operation of selecting either of the button 51 indicating “use as it is” or the button 52 indicating “use my design” in the my-design use/non-use selection window 50, and when an operation of selecting either of the button 51 or the button 52 has been performed (YES), the processor 11 advances the process to step S207.

In step S207, the processor 11 ends the display of the effect selection window 30 and the my-design use/non-use selection window 50, and determines an effect to be used. This will be specifically described below. When the button 51 indicating “use as it is” has been selected in step S206, the processor 11 determines, as the effect to be used, the effect (see FIG. 16) shown by the effect image selected in step S204. That is, the processor 11 determines an effect (effect ID) shown in FIG. 16, as the effect to be used. Meanwhile, when the button 52 indicating “use my design” has been selected in step S206, the processor 11 determines, as the effect to be used, an effect that uses the my-design data 104 (the texture of the particle created by the user) instead of the particle data 304, for the effect (effect ID; see FIG. 16) shown by the effect image selected in step S204. That is, the processor 11 determines, as the effect to be used, an effect that displays the particle created by the user while using a behavior and the like of the effect shown by the effect image selected in step S204. Then, the process proceeds to step S208 in FIG. 19.

When the my-design data 104 has not been set (that is, when the user has not created any texture of my design), the processes of steps S205 and S206 are not executed, and in step S207, the processor 11 determines, as the effect to be used, an effect (see FIG. 16) shown by the effect image selected in step S204.

In step S208 in FIG. 19, similar to step S102 of FIG. 17, the processor 11 performs a player character moving process of, for example, moving the player character 20 in accordance with an operation performed by the user. Then, the process proceeds to step S209.

In step S209, on the basis of the operation data 107, the processor 11 determines whether or not an effect addition operation (an operation of pressing the A button) has been performed. When the determination in step S209 is YES, the process proceeds to step S210, and when this determination is NO, the process returns to step S208.

In step S210, the processor 11 determines whether or not there is a furniture article having a predetermined positional relationship with respect to the player character 20. Specifically, on the basis of the arrangement furniture article data 102 and the player character data 105, the processor 11 determines whether or not there is a furniture article in a predetermined range (e.g., within 30 cm in the virtual space) at the front of the player character 20. When the determination in step S210 is YES, the process proceeds to step S211, and when this determination is NO, the process returns to step S208.

In step S211, the processor 11 causes the display section 15 to start display of the first stage polishing operation and display of the first stage effect. Specifically, as described with reference to FIG. 7, the processor 11 causes the display section 15 to start display in which the player character 20 performs the first stage polishing operation (small-scale polishing operation) and the first stage effect (small-scale effect) of the “effect to be used” determined in step S207 in FIG. 18 has been added to the furniture article determined in step S210. At this time, the processor 11 uses the arrangement furniture article data 102, the furniture article database 101, the effect database 103, and the like. Then, the process proceeds to step S212.

Through the processes of steps S208 to S211, the user can add an effect to a desired furniture article by, for example, moving the player character 20.

In step S212, on the basis of the operation data 107, the processor 11 determines whether or not the effect addition operation (the operation of pressing the A button) has been continued for 5 seconds. When the determination in step S212 is YES, the process proceeds to step S214, and when this determination is NO, the process proceeds to step S213.

In step S213, on the basis of the operation data 107, the processor 11 determines whether or not the effect addition operation (the operation of pressing the A button) has ended. That is, the processor 11 determines whether or not a long pressing operation of the A button has ended. When the determination in step S213 is YES, the process proceeds to step S219, and when this determination is NO, the process returns to step S212.

In step S214, the processor 11 causes the display section 15 to start display of the second stage polishing operation and display of the second stage effect. Specifically, as described with reference to FIG. 8, the processor 11 causes the display section 15 to start display in which the player character 20 performs the second stage polishing operation (middle-scale polishing operation) and the effect being displayed has been switched to the second stage effect (middle-scale effect). Then, process proceeds to step S215.

In step S215, on the basis of the operation data 107, the processor 11 determines whether or not the effect addition operation (the operation of pressing the A button) has been continued for 10 seconds. When the determination in step S215 is YES, the process proceeds to step S217, and when this determination is NO, the process proceeds to step S216.

In step S216, on the basis of the operation data 107, the processor 11 determines whether or not the effect addition operation (the operation of pressing the A button) has ended. When the determination in step S216 is YES, the process proceeds to step S219, and when this determination is NO, the process returns to step S215.

In step S217, the processor 11 causes the display section 15 to start display of the third stage polishing operation and display of the third stage effect. Specifically, as described with reference to FIG. 9, the processor 11 causes the display section 15 to start display in which the player character 20 performs the third stage polishing operation (large-scale polishing operation) and the effect being displayed has been switched to the third stage effect (large-scale effect). Then, the process proceeds to step S218.

In step S218, on the basis of the operation data 107, the processor 11 waits (NO) until the effect addition operation (the operation of pressing the A button) ends, and when the effect addition operation has ended, (YES), the processor 11 advances the process to step S219.

In step S219, the processor 11 causes the display of the polishing operation of the player character 20 to end. Then, the process proceeds to step S104 in FIG. 17.

Through the processes of steps S209 to S218 described above, the user can add a desired effect, by performing the effect addition operation (the operation of pressing the A button) on a furniture article having a predetermined positional relationship with respect to the player character 20. In addition, the user can set the scale of the effect (the first to third stage effects) in accordance with the length for which the effect addition operation (the operation of pressing the A button) is continued.

In step S104 in FIG. 17, the processor 11 performs an effect deletion process of deleting (canceling) the effect having been added to the furniture article.

Figure 20:
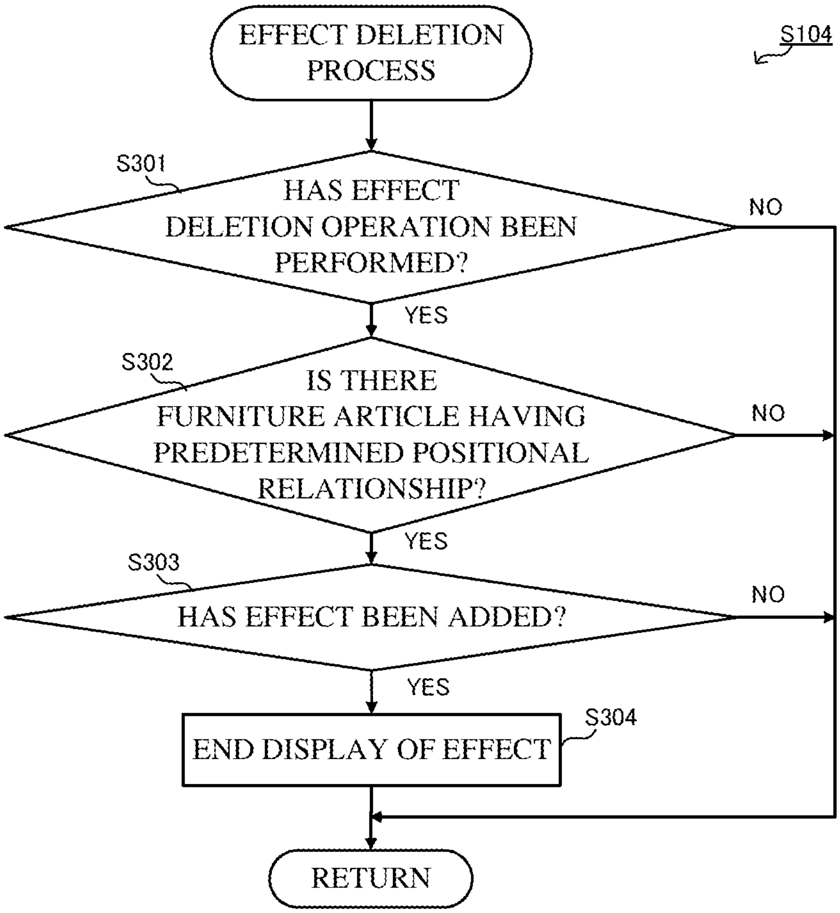
FIG. 20 is a non-limiting example of a flow chart showing an effect deletion process.

FIG. 20 is an example of a detailed flow chart of the effect deletion process in step S104. With reference to FIG. 20, the effect deletion process will be described below.

In step S301 in FIG. 20, on the basis of the operation data 107, the processor 11 determines whether or not an effect deletion operation (an operation of pressing a Y button). When the determination in step S301 is YES, the process proceeds to step S302, and when this determination is NO, the process proceeds to step S105 in FIG. 17.

In step S302, the processor 11 determines whether or not there is a furniture article having a predetermined positional relationship with respect to the player character 20. Specifically, on the basis of the arrangement furniture article data 102 and the player character data 105, the processor 11 determines whether or not there is a furniture article in a predetermined range (e.g., within 30 cm in the virtual space) at the front of the player character 20. When the determination in step S302 is YES, the process proceeds to step S303, and when this determination is NO, the process proceeds to step S105 in FIG. 17.

In step S303, on the basis of the arrangement furniture article data 102, the processor 11 determines whether or not an effect has been added to the furniture article determined in step S302. When the determination in step S303 is YES, the process proceeds to step S304, and when this determination is NO, the process proceeds to step S105 in FIG. 17.

In step S304, the processor 11 deletes the effect added to the furniture article, and causes the effect display to end. Then, the process proceeds to step S105 in FIG. 17.

In step S105 in FIG. 17, on the basis of the operation data 107, the processor 11 determines whether or not a game ending operation has been performed. When the determination in step S105 is YES, the game processing is caused to end, and when this determination is NO, the process returns to step S101, and the game processing is caused to be continued.

As described above, according to the exemplary embodiment, the user can, as a part of the game, add an effect to a furniture article in the game by using the player character 20. Therefore, the user can enjoy a game element of adding an effect to a furniture article.

In addition, the user can select the kind of the effect (see FIG. 4 and FIG. 5), and can set the scale of the effect (see FIG. 7 to FIG. 9). Therefore, the user can add an effect to a furniture article in various manners.

Further, in accordance with the kind of the effect, the kind, behavior, etc., of a particle that occurs is different (see FIG. 4 and FIG. 10), and thus, various effects that suit the image of the user can be added to the furniture article.

Further, since the reference effect is applied so as to suit the size of the furniture article, to add an effect to the furniture article (see FIG. 11 to FIG. 13), the process load and the development load can be reduced.

In addition, an effect that uses my design can be added to the furniture article (see FIG. 5 and FIG. 6). Therefore, while using a texture created by the user as my design, and with a behavior and the like of a desired effect, it is possible to display a particle (a particle using the texture).

[Modifications]

In the exemplary embodiment described above, an example in which an effect is added to a furniture article has been described. However, an effect may be added to an item other than a furniture article.

In the exemplary embodiment described above, an example in which an effect is added to a furniture article (item) in a room has been described. However, an effect may be added to an item outside (i.e., outdoor) the room.

In the exemplary embodiment described above, an example in which a particle is a planar object (an object obtained by attaching a texture to a planar polygon) has been described. However, the particle may be a three-dimensional object (an object obtained by attaching a texture to a three-dimensional polygon).

In the exemplary embodiment described above, an example in which the orientation, of a particle being a planar object, to the virtual camera is not restricted in particular has been described. However, the normal line direction of the particle being a planar object may be directed to the virtual camera. Accordingly, the particle being a planar object can be seen as always facing the front face (while preventing the particle from being seen as a thin shape or a line).

In the exemplary embodiment described above, an example in which the scale of the effect (the first to third stage effects) is set in accordance with the operation time (a long pressing time of the A button) has been described (see FIG. 19). However, the scale of the effect (the first to third stage effects) may be set in accordance with the number of times of operation (e.g., the number of times of pressing the A button).

In the exemplary embodiment described above, the scale of the effect (the first to third stage effects) may be increased by performing an operation (an operation of adding an effect) using the player character 20 on a furniture article to which the effect has been added. In a case where the effect having been added is a third stage effect, the effect may be caused to return to the first stage effect by performing an operation (an operation of adding the effect) using the player character 20.

In the exemplary embodiment described above, an example in which an effect is added by using the player character 20 (see FIG. 7 to FIG. 9) has been described. However, an effect may be added by using a cursor (e.g., see the cursor 40 in FIG. 4). In this case, for example, a furniture article may be designated (selected) by the cursor, whereby an effect may be added to the furniture article.

In the exemplary embodiment described above, an example in which a particle occurs at a surface of the reference cube space in the reference effect has been described. However, a particle may occur inside the reference cube space in the reference effect. Accordingly, for example, an effect in which a particle comes out from the inside of the furniture article can be realized.

In the exemplary embodiment described above, an example in which the particle occurrence position is fixed in the reference effect has been described (see FIG. 11). However, in the reference effect, the particle occurrence position may be set to move. Then, in an effect added to a furniture article, the place where the particle occurs will move.

In the exemplary embodiment described above, as a method for setting the behavior and the like of a particle to be varied in accordance with the kind of the effect, a method of replacing a parameter included in data (program) for causing execution of a behavior and the like may be used, or a method of replacing the entire data may be used.

In the above embodiment, a case where the series of processes according to the game processing are performed in a single game apparatus 10 has been described. However, in another embodiment, the series of processes above may be performed in an information processing system that includes a plurality of information processing apparatuses. For example, in an information processing system that includes a terminal side apparatus and a server side apparatus capable of communicating with the terminal side apparatus via a network, a part of the series of processes above may be performed by the server side apparatus. Alternatively, in an information processing system that includes a terminal side apparatus and a server side apparatus capable of communicating with the terminal side apparatus via a network, a main process of the series of processes above may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 10 may be configured to send operation data indicating a user's operation to a predetermined server, and the server may be configured to execute various types of game processing and stream the execution results as video/audio to the game apparatus 10.

While the exemplary embodiment has been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having stored therein instructions to be executed by an information processing apparatus that includes one or more processors, the instructions configured to cause at least one of the processors to perform operations comprising:

causing a texture generation graphical user interface to be displayed and processing, in connection with the texture generation graphical user interface, user provided input to generate a new image;

storing the generated new image as user generated texture data, and linking the user generated texture data to at least one arrangement object;

arranging or moving the at least one arrangement object in a virtual space based on an operation input;

moving a player character in the virtual space based on an operation input;

based on a first instruction provided in a case where a positional relationship between the player character and at least one of the at least one arrangement object satisfies a predetermined condition, causing the player character to perform an action on the arrangement object;

based on a virtual camera in the virtual space, generating a game image in which the player character and the arrangement object are included;

based on performance of the action on the arrangement object, generating, for the game image, a visual effect that is added to the arrangement object on which the action has been performed, wherein the visual effect is generated based on the user generated texture data that is linked to the arrangement object; and during the visual effect, controlling particles within the generated visual effect based on: 1) a time period over which the first instruction is provided, or 2) a number of times the first instruction is provided.

2. The storage medium according to claim 1, wherein the operations further comprise causing the visual effect to be added by arranging a predetermined particle in a predetermined region including the arrangement object in the virtual space.

3. The storage medium according to claim 2, wherein the predetermined particle is a planar object using a two-dimensional image as a texture.

4. The storage medium according to claim 3, wherein the operations further comprise:

causing, before causing the player character to perform the action, a two-dimensional image that is to be used for the predetermined particle, to be selected from a plurality of candidate images based on an operation input, and causing the visual effect to be added by using the selected two-dimensional image.

5. The storage medium according to claim 4, wherein a two-dimensional image is used as the predetermined particle that is inputted based on an operation input, wherein the two-dimensional image is saved as a candidate image.

6. The storage medium according to claim 2, wherein the predetermined particle is a three-dimensional object.

7. The storage medium according to claim 2, wherein the operations further comprise:

causing at least one of deformation and movement to be performed in the predetermined region on the predetermined particle that has been arranged.

8. The storage medium according to claim 7, wherein the operations further comprise:

causing, before causing the player character to perform the action, one of a plurality of representation candidates to be selected based on an operation input, causing a control of at least one of arrangement, deformation, and movement of the predetermined particle to be defined to each of the plurality of representation candidates so as to be associated therewith, and causing the predetermined particle to be controlled based on a control associated with the selected representation candidate, thereby causing the visual effect to be added.

9. The storage medium according to claim 1, wherein controlling the particles includes setting at least one of a size, a deformation speed, or a moving speed of the particles based on: 1) the time period over which the first instruction is provided, or 2) the number of times the first instruction is provided.

10. The storage medium according to claim 1, wherein the operations further comprise:

canceling, based on an operation input, the visual effect with respect to the arrangement object to which the visual effect has been added.

11. The storage medium according to claim 1, wherein the action is an action of wiping or polishing the arrangement object performed by the player character.

12. The storage medium according to claim 1, wherein the arrangement object is a furniture article object.

13. A game processing system comprising:

a processor and a memory coupled thereto, the processor being configured to control the game processing system to perform operations comprising:

causing a texture generation graphical user interface to be displayed and processing, in connection with the texture generation graphical user interface, user provided input to generate a new image;

storing the generated new image as user generated texture data, and linking the user generated texture data to at least one arrangement object; arranging or moving the at least one arrangement object in a virtual space based on an operation input;

moving a player character in the virtual space based on an operation input;

based on a first instruction provided in a case where a positional relationship between the player character and at least one of the at least one arrangement object satisfies a predetermined condition, causing the player character to perform an action on the arrangement object; and based on a virtual camera in the virtual space, generating a game image in which the player character and the arrangement object are included;

based on performance of the action on the arrangement object, generating, for the game image, a visual effect that is added to the arrangement object on which the action has been performed, wherein the visual effect is generated based on the user generated texture data that is linked to the arrangement object; and during the visual effect, controlling particles within the visual effect based on: 1) a time period over which the first instruction is provided, or 2) a number of times the first instruction is provided.

14. The game processing system according to claim 13, wherein the visual effect is added by arranging a predetermined particle in a predetermined region including the arrangement object in the virtual space.

15. The game processing system according to claim 14, wherein the predetermined particle is a planar object using a two-dimensional image as a texture.

16. The game processing system according to claim 15, wherein the operations further comprise:

selecting, before causing the player character to perform the action, based on an operation input, a two-dimensional image that is to be used for the predetermined particle from a plurality of candidate images; and adding the visual effect by using the selected two-dimensional image.

17. The game processing system according to claim 16, wherein the operations further comprise:

inputting, based on an operation input, a two-dimensional image that is to be used as the predetermined particle; and saving the two-dimensional image as a candidate image.

18. The game processing system according to claim 14, wherein the predetermined particle is a three-dimensional object.

19. The game processing system according to claim 14, wherein the operations further comprise causing at least one of deformation and movement to be performed in the predetermined region on the predetermined particle that has been arranged, thereby adding the visual effect.

20. The game processing system according to claim 19, wherein the operations further comprise:

selecting, before causing the player character to perform the action, one of a plurality of representation candidates based on of an operation input, defining a control of at least one of arrangement, deformation, and movement of the predetermined particle to each of the plurality of representation candidates so as to be associated therewith, and controlling the predetermined particle based on a control associated with the selected representation candidate, thereby adding the visual effect.

21. The game processing system according to claim 13, wherein controlling the particles includes setting at least one of a size, a deformation speed, or a moving speed of the particles based on: 1) the time period over which the first instruction is provided, or 2) the number of times the first instruction is provided.

22. The game processing system according to claim 13, wherein the operations further comprise: canceling the visual effect based on an operation input, with respect to the arrangement object to which the visual effect has been added.

23. The game processing system according to claim 13, wherein the action is an action of wiping or polishing the arrangement object performed by the player character.

24. The game processing system according to claim 13, wherein the arrangement object is a furniture article object.

25. A game processing apparatus comprising:

a processor and a memory coupled thereto, the processor being configured to control the game processing apparatus to at least:

cause a texture generation graphical user interface to be displayed and processing, in connection with the texture generation graphical user interface, user provided input to generate a new image;

store the generated new image as user generated texture data, and linking the user generated texture data to at least one arrangement object; arranging or moving the at least one arrangement object in a virtual space based on an operation input;

move a player character in the virtual space based on an operation input;

based on a first instruction provided in a case where a positional relationship between the player character and at least one of the at least one arrangement object satisfies a predetermined condition, cause the player character to perform an action on the arrangement object; and based on a virtual camera in the virtual space, generate a game image in which the player character and the arrangement object are included;

based on performance of the action on the arrangement object, generating, for the game image, a visual effect that is added to the arrangement object on which the action has been performed, wherein the visual effect is generated based on the user generated texture data that is linked to the arrangement object; and during the visual effect, controlling particles within the generated visual effect based on: 1) a time period over which the first instruction is provided, or 2) a number of times the first instruction is provide.

26. The game processing apparatus according to claim 25, wherein the processor adds the visual effect by arranging a predetermined particle in a predetermined region including the arrangement object in the virtual space.

27. The game processing apparatus according to claim 26, wherein the predetermined particle is a planar object using a two-dimensional image as a texture.

28. The game processing apparatus according to claim 27, wherein the processor further:

selects, before causing the player character to perform the action, based on an operation input, a two-dimensional image that is to be used for the predetermined particle from a plurality of candidate images, and adds the visual effect by using the selected two-dimensional image.

29. The game processing apparatus according to claim 28, wherein the processor further inputs, based on an operation input, a two-dimensional image that is to be used as the predetermined particle, and saves the two-dimensional image as a candidate image.

30. The game processing apparatus according to claim 26, wherein the predetermined particle is a three-dimensional object.

31. The game processing apparatus according to claim 26, wherein the processor further causes at least one of deformation and movement to be performed in the predetermined region on the predetermined particle that has been arranged, thereby adding the visual effect.

32. The game processing apparatus according to claim 31, wherein the processor further:

selects, before causing the player character to perform the action, one of a plurality of representation candidates based on an operation input, defines a control of at least one of arrangement, deformation, and movement of the predetermined particle to each of the plurality of representation candidates so as to be associated therewith, and controls the predetermined particle based on a control associated with the selected representation candidate, thereby adding the visual effect.

33. The game processing apparatus according to claim 25, wherein controlling the particles includes setting at least one of a size, a deformation speed, or a moving speed of the particles based on: 1) the time period over which the first instruction is provided, or 2) the number of times the first instruction is provided.

34. A game processing method executed by a processor, the game processing method comprising:

causing a texture generation graphical user interface to be displayed and processing, in connection with the texture generation graphical user interface, user provided input to generate a new image;

storing the generated new image as user generated texture data, and linking the user generated texture data to at least one arrangement object; arranging or moving the at least one arrangement object in a virtual space based on an operation input;

moving a player character in the virtual space based on an operation input;

based on a first instruction provided in a case where a positional relationship between the player character and at least one of the at least one arrangement object satisfies a predetermined condition, causing the player character to perform an action on the arrangement object; and based on a virtual camera in the virtual space, generating a game image in which the player character and the arrangement object are included;

based on performance of the action on the arrangement object, generating, for the game image, a visual effect that is added to the arrangement object on which the action has been performed, wherein the visual effect is generated based on the user generated texture data that is linked to the arrangement object; and during the visual effect, controlling particles within of the generated visual effect based on: 1) a time period over which the first instruction is provided, or 2) a number of times the first instruction is provided.

35. The game processing method according to claim 34, further comprising adding the visual effect by arranging a predetermined particle in a predetermined region including the arrangement object in the virtual space.

36. The game processing method according to claim 35, wherein the predetermined particle is a planar object using a two-dimensional image as a texture.

37. The game processing method according to claim 36, further comprising:

selecting, before causing the player character to perform the action and based on an operation input, a two-dimensional image that is to be used for the predetermined particle from a plurality of candidate images, and adding the visual effect by using the selected two-dimensional image.

38. The game processing method according to claim 37, further comprising:

inputting, based on an operation input, a two-dimensional image that is to be used as the predetermined particle; and saving the two-dimensional image as a candidate image.

39. The game processing method according to claim 35, wherein the predetermined particle is a three-dimensional object.

40. The game processing method according to claim 35, further comprising:

performing at least one of deformation and movement in the predetermined region on the predetermined particle that has been arranged, thereby causing the visual effect to be added.

41. The game processing method according to claim 40, further comprising:

selecting, before causing the player character to perform the action, one of a plurality of representation candidates based on an operation input, defining a control of at least one of arrangement, deformation, and movement to each of the plurality of representation candidates so as to be associated therewith, and controlling the predetermined particle based on a control associated with the selected representation candidate, thereby causing the visual effect to be added.

42. The game processing method according to claim 34, wherein controlling the particles includes setting at least one of a size, a deformation speed, or a moving speed of the particles based on: 1) the time period over which the first instruction is provided, or 2) the number of times the first instruction is provided.

* * * * *